A. WICHERTJES.
TOP CUTTING MECHANISM FOR POTATO DIGGERS.
APPLICATION FILED SEPT. 24, 1910.
1,003,680.
Patented Sept. 19, 1911.
2 SHEETS—SHEET 2.
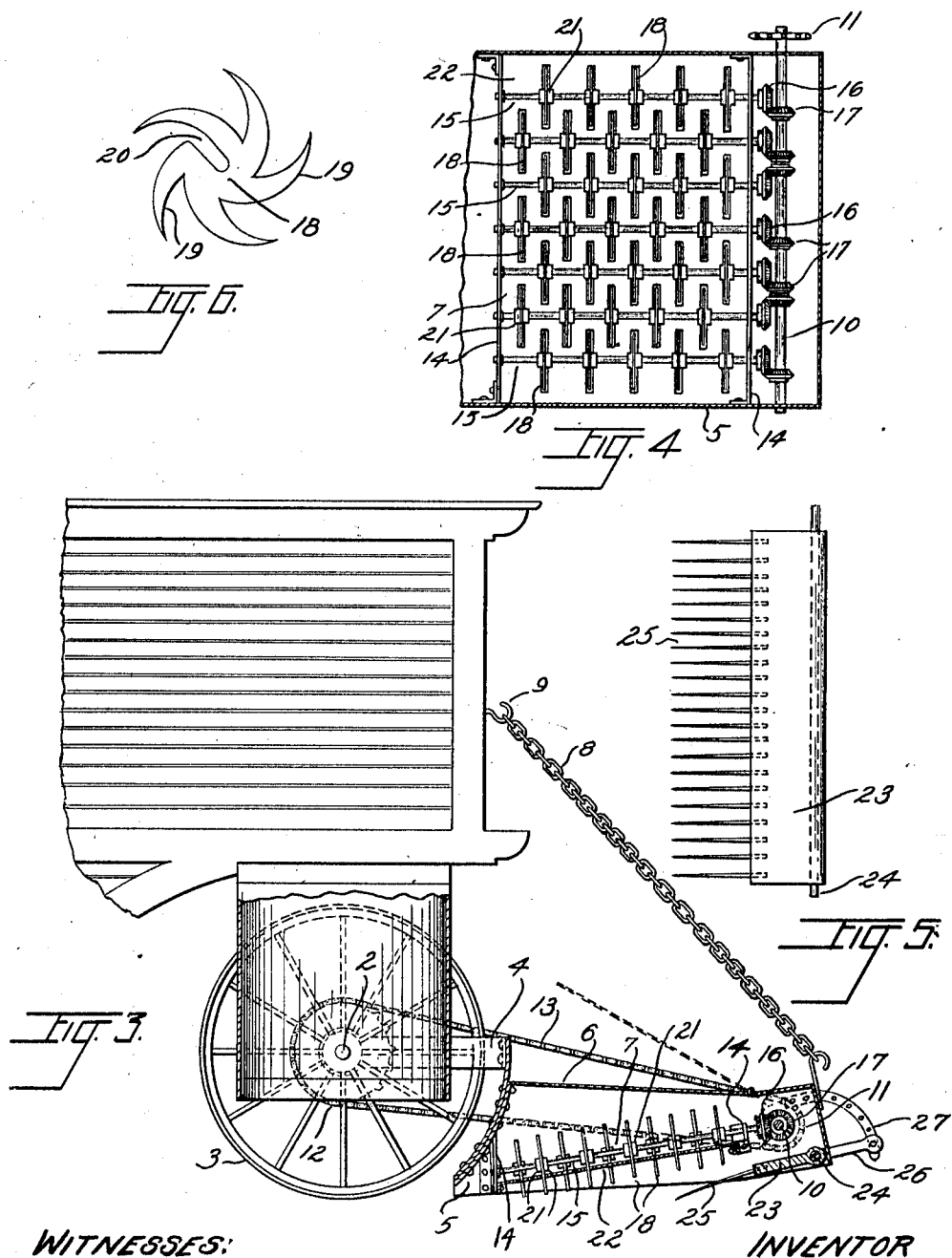
WITNESSES:
INVENTOR
Arend Wichertjes
BY
Robt. Klotz
ATTORNEY

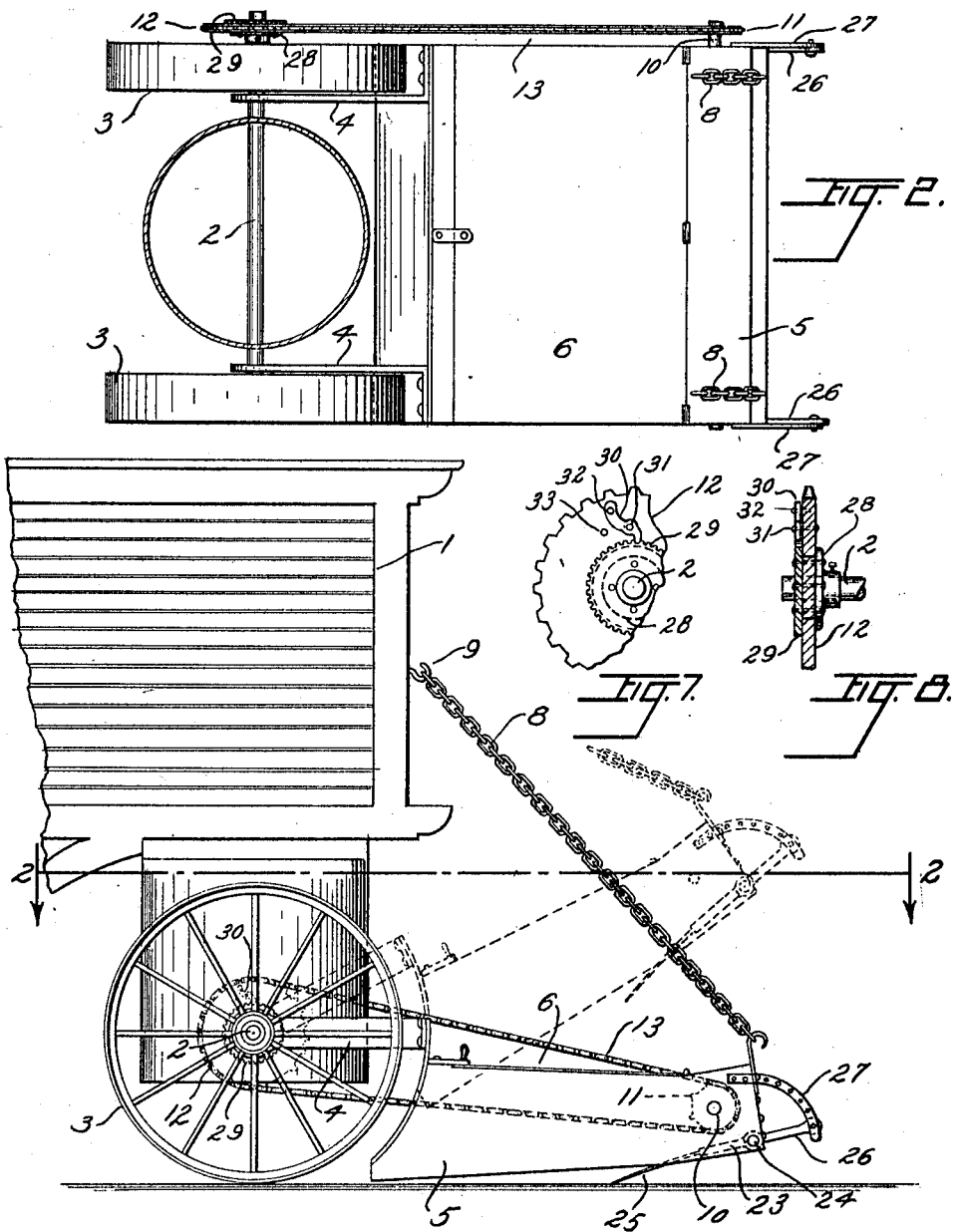

UNITED STATES PATENT OFFICE.

AREND WICHERTJES, OF CHICAGO, ILLINOIS.

TOP-CUTTING MECHANISM FOR POTATO-DIGGERS.

1,003,680.  Specification of Letters Patent.  Patented Sept. 19, 1911.

Application filed September 24, 1910. Serial No. 583,561.

*To all whom it may concern:*

Be it known that I, AREND WICHERTJES, a citizen of the United States, and residing at Chicago, in the county of Cook and State of Illinois, have invented a new and useful Improvement in Top-Cutting Mechanism for Potato-Diggers, of which the following is a complete specification.

The main objects of this invention are to provide mechanism for cutting potato tops and weeds in advance of the digging mechanism of potato diggers; to provide improved mechanism adapted to cut the potato tops and weeds into such small fragments that they will not interfere with the digging operation or the subsequent tillage of the soil; to provide top cutting mechanism for potato diggers which is adapted to be adjusted to and from the surface of the ground; and to provide means for arranging the tops and weeds in position to be most readily cut by the cutting mechanism.

A specific construction embodied in said invention is illustrated in the accompanying drawings, in which:

Figure 1 is a fragmentary view of a potato digger showing the top cutting mechanism in side elevation. Fig. 2 is a section taken on line 2—2 of Fig. 1 and showing the top cutting mechanism in plan view. Fig. 3 is a fragmentary side elevation of a potato digger with the top cutting mechanism in vertical section. Fig. 4 is a plan view of the cutting mechanism with the top of the casing removed. Fig. 5 is a plan view of the top arranging or straightening rake. Fig. 6 is a side elevation of one of the knives. Fig. 7 is a fragmentary, side elevation of the drive sprocket and means for locking it to the axle. Fig. 8 is a section of the same.

In the construction shown, the forward end of the body 1 of the potato digger is mounted upon a rotative axle 2 which has traction wheels 3 rigidly fixed thereon, so that when the machine moves the wheels will rotate the axle.

Pivoted on the axle 2 are the forwardly directed arms 4 which rigidly support a casing 5 at their forward ends. Said casing is open at its under side and is provided on its top with a hinged cover 6 by means of which access may be had to the cutting mechanism 7. Any preferred means may be provided for supporting and adjusting the front end of the casing 5, but as shown, chains 8 are fastened to the front end of the casing and are adapted to be secured to hooks 9 on the front end of the body 1. By connecting the chains to the hooks at greater or less distances from the casing the latter may be adjusted with respect to the ground.

Journaled in suitable bearings in the front end of the casing 5 is the transmission shaft 10 which is provided on one end thereof, on the outer side of the casing, with a sprocket wheel 11 which is in alinement with a sprocket wheel 12 which is loosely mounted on a collar 28 rigidly secured on the axle 2. Secured on the collar 28 is a ratchet 29, and a pawl 30 is pivoted on the sprocket 12 by means of a bolt 31 and is adapted to engage the ratchet and lock the sprocket to the axle. The outer end of the pawl is provided with a pin 32 which is adapted to engage in holes 33 in the sprocket 12 and hold the pawl either in or out of engagement with the ratchet, as desired. A sprocket chain 13 is carried on said sprocket wheels and is adapted to rotate the transmission shaft when the pawl is in engagement with the ratchet.

Extending across the casing 5, near the front and rear ends thereof, are the bearing brackets 14 in which are journaled a plurality of knife shafts 15 which extend longitudinally of the machine. Each knife shaft is provided on its end adjacent to the transmission shaft with a beveled pinion 16, which pinions are adapted to mesh with and be driven by beveled pinions 17 on the transmission shaft. The pinions 17 are so arranged that part of the shafts 15 are driven in one direction and part in the other.

Removably mounted on each knife shaft 15 are a plurality of knives 18, each of which is provided with a plurality of radially directed blades 19, and a notch 20 by means of the latter of which the knife may be placed on or removed from the shaft. For the purpose of securing the knives on the shafts, the shafts are provided with pairs of clamping nuts 21 between which the knives are clamped. By loosening one nut of a given pair a knife may be inserted or removed. In this manner the knives may be individually removed for the purpose of repairing or replacing them by others. The knives on alternate shafts are arranged staggering and immediately beneath the knife shafts is a plate 22 having slots therein through which the blades project. Said plate forms an abutment against which the knives may cut and prevent them carrying the tops over the shafts.

For the purpose of straightening or arranging the tops and weeds so that the knives will cut them, a rake 23 is pivoted on a shaft 24 at the forward end of the casing and the tines 25 thereof extend rearwardly beneath the knife shafts. On the front of the rake are forwardly directed arms 26 which are adapted to be secured to curved bars 27 mounted on the casing. Said bars are provided with a plurality of apertures, so that the forward ends of the arms 26 may be secured at different heights to tilt the rake to the desired angle.

The operation of the construction shown is as follows: The casing 5 is adjusted at the desired height from the ground and the rake is set at the proper angle to arrange the tops and weeds in the direction in which the machine is to move. When the machine is driven forwardly the sprocket chain rotates the transmission shaft which in turn rotates the knife shafts. The knives catch the tops and weeds and either cut them immediately or carry them against the cutting plate 22 where they are cut into small fragments. The tops and weeds thus cut up will neither interfere with the digging operation nor interfere with the subsequent tillage of the soil.

The knives may be adjusted to and from the ground according to the size and amount of tops and weeds, and the rake is adjusted according to the distance of the knives from the ground.

While I have shown and described but one specific embodiment of my invention, it will be understood that numerous details of the construction shown may be varied or omitted without departing from the scope of the claims.

I claim:

1. In a device of the class described the combination with inclosed cutting mechanism comprising a plurality of parallel shafts having knives thereon arranged staggering, of means in advance of the cutting mechanism adapted to arrange the material to be cut in a forward direction beneath the cutting mechanism, and means for operating the cutting mechanism.

2. A device of the class described, comprising a rotative axle, cutting mechanism pivotally supported thereon, and means in advance of said cutting mechanism and adjustable independently thereof adapted to straighten the material beneath the cutting mechanism.

3. A device of the class described, comprising a rotative axle, a forwardly inclined casing pivotally supported on the axle, cutting mechanism in said casing, means adapted to vary the inclination of the casing and cutting mechanism, means adapted to operate the cutting mechanism from the axle, and means adapted to turn the material to be cut in a forward direction.

4. A device of the class described, comprising a rotative axle, a casing pivoted on said axle and adapted to be adjusted at various inclinations, cutting mechanism mounted in said casing, means for operating the cutting mechanism, and a rake adjustably mounted on the front end of the casing and adapted to be adjusted independently thereof.

5. A device of the class described, comprising a rotative axle, a casing pivoted on said axle and open at its bottom, means for varying the inclination of the casing, rotative cutting mechanism in said casing, means for operating said cutting mechanism, and a rake adjustably mounted on the front end of the casing.

6. A device of the class described, comprising a rotative axle, a casing adjustably mounted on said axle and open at its bottom, a cutting board in said casing, a plurality of rotative knives in said casing and projecting through the cutting board, and means for operating said knives.

7. A device of the class described, comprising means adapted to straighten potato tops, cutting means adapted to cut said tops in fragments and comprising a plurality of rotative shafts having independently removable knives thereon, and means for operating said cutting means.

8. In a device of the class described the combination with a rotative axle, a casing pivotally mounted on said axle, a plurality of longitudinally directed knife shafts in said casing, means for operating said shafts, a plurality of overlapping knives on said shafts, and a slotted board beneath said shafts through which the knives project and adapted to afford an abutment for the knives to cut against.

9. A device of the class described, comprising a wheeled body, a casing pivoted at the forward end of said body, a plurality of overlapping rotative knives in said casing, means for operating said knives, means providing an abutment for the knives to cut against, and means adapted to straighten the material to be cut in advance of the knives.

10. A device of the class described, comprising a wheeled body, forwardly inclined cutting mechanism pivotally mounted at the front of the body, means for operating the cutting mechanism, a rake pivotally mounted in advance of the cutting mechanism, a forwardly projecting arm on the rake, a curved bar projecting forwardly from the casing, means for adjustably securing the arm to the bar to vary the inclination of the rake and means for adjusting the cutting mechanism to and from the ground.

In witness whereof I have hereunto subscribed my name in the presence of two witnesses.

AREND WICHERTJES.

Witnesses:
W. W. WITHENBURY,
D. D. SWEM.

Copies of this patent may be obtained for five cents each, by addressing the "Commissioner of Patents, Washington, D. C."